United States Patent
Paul et al.

(10) Patent No.: US 12,214,817 B2
(45) Date of Patent: Feb. 4, 2025

(54) VEHICLE CONTROL SYSTEM AND METHOD

(71) Applicant: Transportation IP Holdings, LLC, Norwalk, CT (US)

(72) Inventors: Anthony D. Paul, Anchorage, AK (US); Milan Karunaratne, Orange, CA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 273 days.

(21) Appl. No.: 17/543,781

(22) Filed: Dec. 7, 2021

(65) Prior Publication Data
US 2023/0174124 A1   Jun. 8, 2023

(51) Int. Cl.
*B61L 27/16*   (2022.01)
*B61L 27/18*   (2022.01)
*G05D 1/00*   (2006.01)
*G06Q 10/083*   (2023.01)

(52) U.S. Cl.
CPC .............. *B61L 27/16* (2022.01); *B61L 27/18* (2022.01); *G05D 1/0278* (2013.01); *G05D 1/0297* (2013.01); *G06Q 10/083* (2013.01)

(58) Field of Classification Search
CPC ....... B61L 27/16; B61L 27/18; G05D 1/0278; G05D 1/0297; G05D 2201/0216; G06Q 10/083
USPC .......................................................... 701/19
See application file for complete search history.

(56) References Cited

U.S. PATENT DOCUMENTS

| | | | |
|---|---|---|---|
| 10,822,007 B2 | 11/2020 | Cooper et al. | |
| 2020/0074575 A1* | 3/2020 | Efird | B60L 53/68 |

OTHER PUBLICATIONS

Boyle "Amazon aims to patent fulfillment centers that can ride the rails and dispatch drones" https://www.geekwire.com/2018/amazon-aims-patent-fulfillment-centers-can-ride-rails-dispatch-drones/; Sep. 20, 2018 (12 pages).

* cited by examiner

*Primary Examiner* — Lindsay M Low
*Assistant Examiner* — Omar Morales
(74) *Attorney, Agent, or Firm* — K&L Gates LLP

(57) ABSTRACT

A vehicle control system and method of operation includes directing a portable distribution vehicle to a first loading location. The portable distribution vehicle may be loaded with first cargo at the first loading location. Instructions may be communicated to the portable distribution vehicle to move from the first loading location to a first distribution location, where the first cargo may be unloaded. The portable distribution vehicle may be a first type of portable distribution vehicle that is allowed to move along a designated route. Vehicles of a second type are prohibited from moving along the designated route. Operation of the portable distribution vehicle may be automatically controlled to move from the first loading location to the first distribution location without an operator onboard the portable distribution vehicle manually controlling the portable distribution vehicle.

18 Claims, 7 Drawing Sheets

VEHICLE CONTROL SYSTEM AND METHOD

BACKGROUND

Technical Field

The subject matter described herein relates to vehicle control systems and methods.

Discussion of Art

In order to meet consumer expectations for fast and/or same-day delivery, supply chain managers are shifting toward a more e-commerce friendly distribution network with smaller, local distribution centers to complement larger, regional distribution centers. Setting up a local distribution center, however, is a costly real estate investment to create warehouses or purchase brick-and-mortar facilities. Additionally, a real estate investment is a commitment to a specific area, despite changing or seasonal demands for goods.

A need exists for a system and method that provides designated vehicles to move along designated routes in order to move goods to different locations based on the current demands by consumers, which is different than existing systems and methods.

BRIEF DESCRIPTION

In accordance with one embodiment, a method may include directing a portable distribution vehicle to a first loading location. The portable distribution vehicle may be loaded with first cargo at the first loading location. Instructions may be communicated to the portable distribution vehicle to move from the first loading location to a first distribution location. The first cargo may be unloaded at the first distribution location. The portable distribution vehicle may move along a designated route for the portable distribution vehicle. The portable distribution vehicle may be a first type of portable distribution vehicle that is allowed to move along the designated route. Vehicles of a second type that is different than the first type are prohibited from moving along the designated route. Operation of the portable distribution vehicle may be automatically controlled to move from the first loading location to the first distribution location without an operator onboard the portable distribution vehicle manually controlling the portable distribution vehicle.

In accordance with one embodiment, a vehicle control system may include a controller having one or more processors that may direct a portable distribution vehicle to a first loading location. The portable distribution vehicle may be loaded with first cargo at the first loading location. The one or more processors may communicate instructions to the portable distribution vehicle to move from the first loading location to a first distribution location. The first cargo may be unloaded at the first distribution location. The portable distribution vehicle may be a first type of portable distribution vehicle that is allowed to move along a designated route. Vehicles of a second type that is different than the first type are prohibited from moving along the designated route. The instructions may automatically control operation of the portable distribution vehicle to move from the first loading location to the first distribution location without an operator onboard the distribution vehicle manually controlling the portable distribution vehicle.

In accordance with one embodiment, a method may include directing a portable distribution rail vehicle to a first loading location. The portable distribution rail vehicle may be loaded with first cargo at the first loading location. Instructions may be communicated to the portable distribution rail vehicle to move from the first loading location to a distribution location. The first cargo may be unloaded at the distribution location. The portable distribution rail vehicle may move along a designated track for the portable distribution rail vehicle. Non-rail vehicles may be prohibited from moving along the designated track. Access to the first cargo disposed onboard the portable distribution rail vehicle may be controlled while the portable distribution rail vehicle is at the distribution location by determining whether a requesting receiver is an approved receiver or an unapproved receiver. The approved received is allowed access to the first cargo, and the unapproved received is prohibited access to the first cargo. The portable distribution rail vehicle may be directed to move away from the distribution location to the first loading location or another loading location responsive to at least a portion of the first cargo being unloaded from the portable distribution rail vehicle at the distribution location by the approved received.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
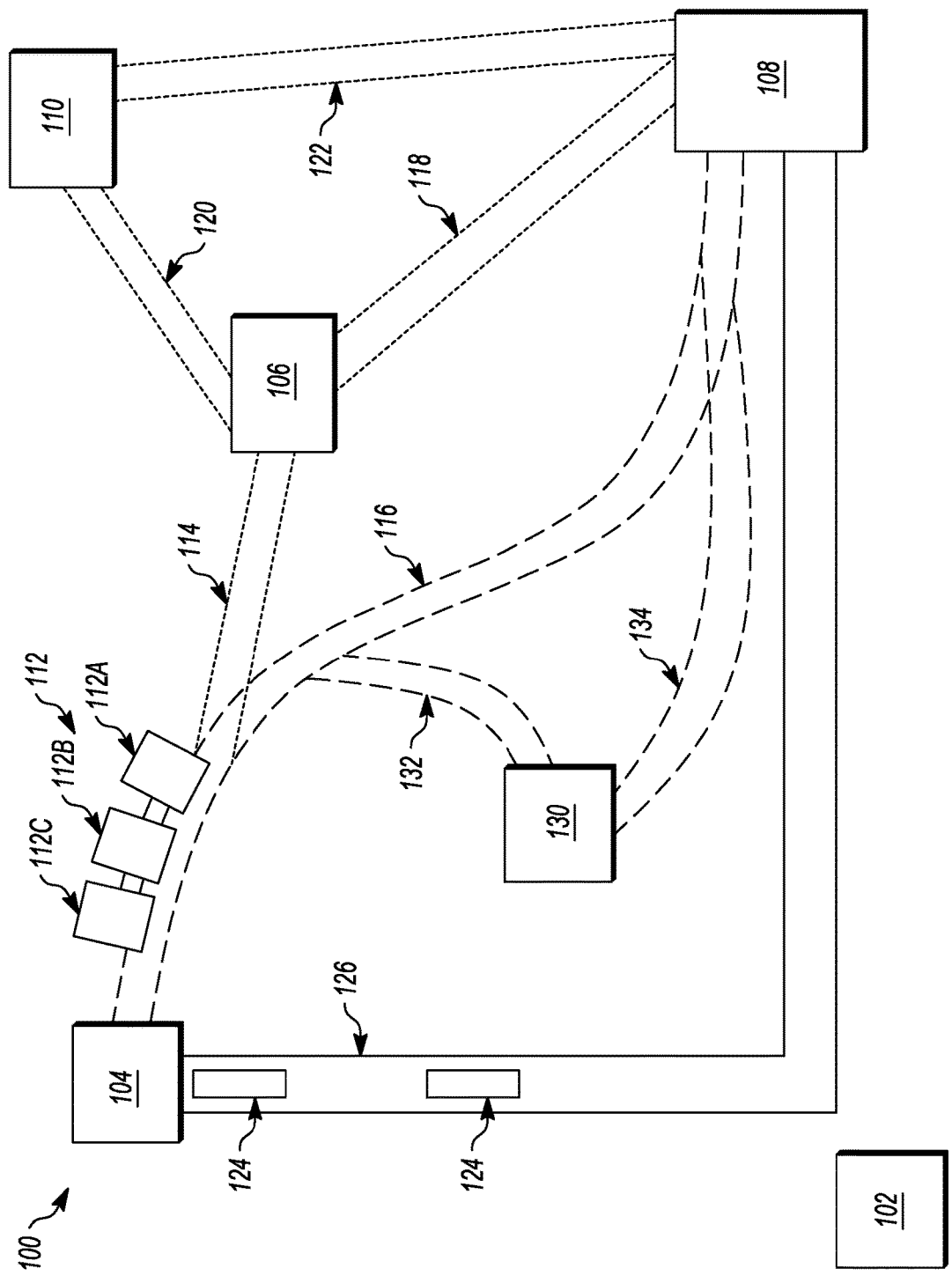
FIG. 1 illustrates a vehicle control system in accordance with one embodiment.

Embodiments of the subject matter described herein relate to a vehicle control system and method of operation. The vehicle control system may direct a portable distribution vehicle to a loading location where the portable distribution vehicle is loaded with cargo. The vehicle control system may direct the portable distribution vehicle to another loading location where additional cargo may be loaded onto the distribution vehicle, to a distribution location where at least some cargo may be removed from the vehicle, or the like. The portable distribution vehicle may receive instructions from the vehicle control system directing the portable distribution where and/or when to move toward the second loading location, the distribution location, or the like. In one embodiment, the vehicle control system may remotely control operation of the portable distribution vehicle. For example, the vehicle control system may wirelessly communicate command messages to a controller of the portable distribution vehicle that automatically changes operating settings of one or more systems of the portable distribution vehicle.

In one or more embodiments, the portable distribution vehicle may be referred to as a portable distribution warehouse, portable warehouse, portable storage facility, or the like, such that the portable distribution vehicle may move goods from one location to another, and may store or hold the goods at a distribution location for a predetermined amount or length of time, until a predetermined amount of the cargo or goods is removed from the portable distribution vehicle, or the like. For example, the portable distribution vehicle may operate as a hyperlocal warehouse for direct-to-consumer deliveries, short-notice deliveries, or the like. As one example, a supplier of a video game console may request a portable distribution vehicle loaded with the video game console to move to a distribution location where retailers of the video game console may access the video game consoles to restock from a reservoir carried onboard the portable distribution vehicle. As another example, a college goods supplier may host a seasonal back-to-school pop-up store in by requesting portable distribution vehicles to be loaded with back-to-school supplies and move along designated routes to distribution areas where the college goods supplier does not have a brick-and-mortar facility.

In one or more embodiments, the portable distribution vehicle may move along designated routes between the loading and distribution locations. The designated routes may be identified as one or more designated routes such that the portable distribution vehicle is capable of and/or allowed to move along the designated routes based on the type, classification, or style of the portable distribution vehicle. In one or more embodiments, the portable distribution vehicle may be incapable of or not allowed to move along non-designated routes. Alternatively, other portable distribution vehicles of other types, classifications, or styles, or non-portable distribution vehicles may be prohibited to, incapable of, or otherwise not allowed to move along the designated routes.

While one or more embodiments are described in connection with a rail vehicle system, not all embodiments are limited to rail vehicle systems. Unless expressly disclaimed or stated otherwise, the inventive subject matter described herein extends to other types of vehicle systems, such as automobiles, trucks (with or without trailers), buses, marine vessels, aircraft, mining vehicles, agricultural vehicles, or other off-highway vehicles. The vehicle systems described herein (rail vehicle systems or other vehicle systems that do not travel on rails or tracks) can be formed from a single vehicle or multiple vehicles. With respect to multi-vehicle systems, the vehicles can be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy).

FIG. 1 illustrates one example of a vehicle control system 100 in accordance with one embodiment. The vehicle control system includes a controller 102, that may be referred to as an off-board controller, that controls operation of one or more vehicle systems, such as a vehicle system 112 that moves along one or more designated routes 114, 116, 118, 120, 122, 132, 134 of the vehicle system. The vehicle system may move along one or more of the designated routes between different loading locations, distribution locations, destination locations, holding areas, or the like. The vehicle system may be remotely controlled by the off-board controller. Optionally, an operator onboard the vehicle system may manually control one or more settings or operations of the vehicle system.

The vehicle system may be a propulsion-generating vehicle such as, but not limited to, a locomotive or other rail vehicle, an automobile, a truck, a bus, a mining vehicle, a marine vessel, an aircraft (manned or unmanned, such as a drone), an agricultural vehicle, or another off-highway vehicle. In one embodiment, the vehicle system may include one or more wheels that may be in contact with the one or more designated routes along which the vehicle system moves. Optionally, the vehicle system may be a marine vessel or an aircraft and may be devoid wheels, or may not require wheels to propel the vehicle system. For example, the vehicle system may move along a waterway, in a flight path, or along another route where wheels of the vehicle system are not necessary. In one or more embodiments, the vehicle system may include two or more vehicles that may travel together (by being mechanically coupled or by being mechanically separate but logically coupled and communicating with each other to travel together, such as in a convoy or a locomotive consist where multiple locomotives communicate and operate together as a train). At least one vehicle of the vehicle system may be a propulsion-generating vehicle, and optionally the vehicle system may include one or more non-propulsion generating vehicles. In the illustrated embodiment, the vehicle system includes three vehicles 112A, 112B, and 112C that are mechanically coupled together and move together along the one or more designated routes.

In one or more embodiments, the vehicle system may be a type, style, and/or classification of vehicle that allows the vehicle system to move along the one or more designated routes 114, 116, 118, 120, 122, 132, 134. For example, the designated routes may be identified as one or more designated routes such that the vehicle system is capable of and/or allowed to move along the designated routes. Additionally, the vehicle system may be a type, classification, or style of vehicle that prohibits the vehicle system from moving along a non-designated route 126. For example, the vehicle system may be incapable or not allowed to move along the non-designated route, but a second type of vehicle 124 may be capable of and/or allowed to move along the non-designated route. In one example, the vehicle system may be a rail vehicle, and the designated routes may be tracks, and the second type of vehicle may be a non-rail vehicle, and the non-designated route may be a road or pathway that does not include tracks. Optionally, the vehicle system may be a marine vessel, and the designated routes may be waterways, and the second type of vehicle may be a non-marine vessel (e.g., a rail vehicle, a non-rail vehicle, an aerial vehicle, or the like) that may be incapable of moving along the designated waterway routes.

In one or more embodiments, the vehicle system may be or have a first classification of a rail vehicle, and the other vehicles may be or have a different, second classification of rail vehicles. The different classifications of the types of rail vehicles may indicate which tracks along which the different rail vehicles may be allowed or capable of traveling. For example, the other vehicles may be commuter rail systems that may be allowed to move along the non-designated route but may be prohibited from moving along the one or more designated routes. Additionally, the vehicle system may be allowed to move along the one or more designated routes, but may be prohibited from moving along the non-designated route. Optionally, the designated routes may be owned and/or operated by a first entity (e.g., person, organization, or the like), and the first entity may only allow vehicles owned and/or operated by the first entity (and/or or vehicles owned and/or operated by a second entities in an agreement with the first entity) to move along the designated routes. Optionally, management or allowance of the different vehicles to move along the designated routes and/or the non-designated routes may be based on other relationships, agreements, licenses, or the like.

In one or more embodiments, the vehicle system may include an onboard controller (not shown) disposed onboard at least one of the vehicles of the vehicle system. The onboard controller may represent a control module, and can include one or more processors, microcontrollers, or other logic-based devices and/or associated software or instructions, for carrying out one or more operations described herein. The controller controls operations of the vehicle system, such as by controlling tractive efforts and/or braking efforts provided by a propulsion system (e.g., a traction motor, an engine, or the like) and braking system. The tractive components operably coupled with the propulsion and/or brake systems (e.g., traction motors, brakes such as air brakes, or the like) may control movement of the wheels (and/or axles joined to the wheels, not shown) of the vehicle system to generate tractive efforts to propel the vehicle system along the route. In addition to providing propulsion force to propel the vehicle system, the propulsion and/or brake systems can act to slow or stop movement of the vehicle system using dynamic braking.

The onboard controller may be manually operated by receiving instruction signals from an input device (e.g., a device that receives input from an operator such as, but not limited to, a touchscreen, a joystick, a keyboard, a switch, a wheel, a microphone, or the like) based on manually input from an operator at the input device. An output device (not shown) can provide information to the operator, such as current operational settings of the vehicle system, designated operational settings of a trip plan, planned stops, target destination, routes along which the vehicle system is to move to reach the planned stops and/or target destinations, characteristics or requirements of cargo onboard the vehicle system (e.g., a type of cargo, an amount, a weight, or the like), or the like.

In one or more embodiments, the controller may be automatically operated to autonomously control operations of the vehicle system. For example, a trip plan may be provided by an energy management system (not shown), by the off-board controller, and/or stored in a tangible and non-transitory computer readable storage medium, or memory (not shown), that is accessible by the onboard controller. The trip plan may designate operational settings of the vehicle system as a function of time or distance along the route for a trip of the vehicle system to a destination location. The designated operational settings of the trip plan may be established in order to reduce one or more of fuel consumed, emissions generated, or time spent in transit by the vehicle system for the trip. The energy management system may include one or more processors, microcontrollers, or other logic-based devices, and/or associated software or instructions, for carrying out one or more operations described herein.

The vehicle system may include a communication device that may be setup for one or both of wired or wireless communication. For example, the communication device can represent transceiving circuitry, one or more antennas, modems, communication cables, or the like. The communication device may allow or enable communication (e.g., receive and/or provide data signals) with the off-board controller, with other vehicles traveling in a consist with the vehicle system, with other vehicles within a predetermined area or location, with the same and/or other types of vehicles or vehicle systems, with wayside devices, or the like. The communication device may be the same as or similar to other communication devices or communication systems described herein.

In one or more embodiments, the vehicle control system may include one or more sensors (e.g., operably coupled with the vehicle system, disposed off-board the vehicle system, coupled with wayside devices or vehicle control devices, or the like) that may measure or sense characteristics of the vehicle system, characteristics of the environment in which the vehicle system moves, or the like. The onboard and/or off-board controllers may receive the sensed data from the one or more sensors. As one example, the sensors may indicate a weight of the vehicle system, and the onboard and/or off-board controllers may determine an amount of cargo being carried by the vehicle system based on the weight data. The controllers may determine or calculate an additional amount of weight the vehicle system may be allowed to carry based on a total amount of weight the vehicle system is capable or designed to carry. As another example, the sensors may indicate a speed at which the vehicle system is moving, a direction in which the vehicle system is moving, whether the vehicle system is slowing down or speeding up, a geospatial position of the vehicle system, or the like. Optionally, the sensors may communicate data to the controllers that may be used to determine a state of the one or more designated routes (e.g., if an obstruction is disposed across at least a portion of one or more of the designated routes), a health of the designated routes, a number of different vehicle systems that have moved along one or more of the designated routes, whether other vehicles (e.g., non-allowed vehicles) have moved along a portion of the designated routes, or the like.

Figure 2:
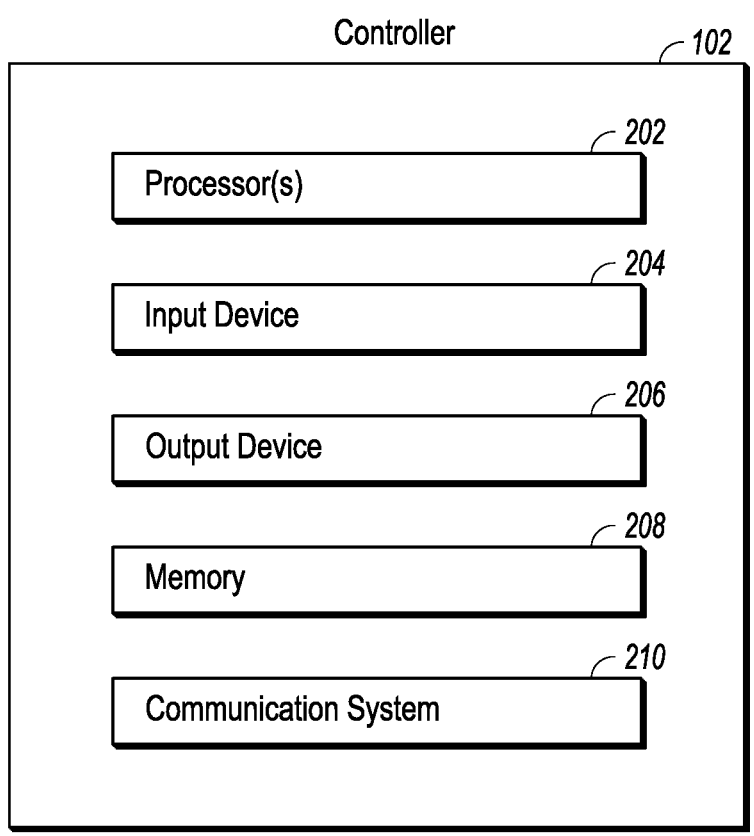
FIG. 2 illustrates a schematic of a controller of the vehicle control system shown in FIG. 1.

The vehicle system may be communicatively coupled with and/or remotely controlled by the off-board controller. FIG. 2 illustrates a schematic of the off-board controller of the vehicle control system in accordance with one or more embodiments. The controller can include one or more processors, microcontrollers, or other logic-based devices and/or associated software or instructions, for carrying out one or more operations described herein.

The controller may be manually operated by receiving instruction signals from an input device 204 e.g., a device that receives input from an operator such as, but not limited to, a touchscreen, a joystick, a keyboard, a switch, a wheel, a microphone, or the like) based on manually input from an operator at the input device. An output device 206 can provide information to the operator, such as data received from sensors onboard or coupled with the vehicle system, sensors disposed off-board the vehicle system (e.g., along one or more of the designated routes), information associated with the vehicle system (e.g., fuel usage, a state of charge or state of fuel available to the vehicle system,), information associated with cargo being carried by the vehicle system (e.g., a type of cargo, a weight and/or amount of the cargo, available space or a total storage capacity of the vehicle system or additional weight that the vehicle system is capable of holding for carrying additional cargo, or the like), information associated with the environment in which the vehicle system is moving (e.g., ambient conditions, a level of other vehicle and/or pedestrian congestion, geographical information, or the like), or the like. The control system may include a memory 208 or other data storage device. In one embodiment, the memory may store data associated with the vehicle system, with the designated routes, or the like. Optionally, the control system may be communicably coupled with other storage databases (e.g., other memory devices of other systems, data storage cloud systems, or the like).

The controller includes a communication system 210 that may be setup for one or both of wired or wireless communication. For example, the communication system can represent transceiving circuitry, one or more antennas, modems, communication cables, or the like. The communication system may allow or enable communication (e.g., receive and/or provide data signals) with a controller onboard the vehicle system, a controller of the other types of vehicles, sensors onboard and/or off-board the vehicle system, a controller of another off-board control system, controllers of one or more wayside devices (not shown), one or more traffic control devices (e.g., traffic lights, barriers, rail crossing gates, or the like), or the like.

In one embodiment, the communication system can interact with other systems via one or more communication types. Suitable communication types can include, but are not limited to, cellular networks (e.g., the Global System for Mobile Communications (GSM)), mesh networks using Ethernet standards, wireless communication protocols (e.g., Bluetooth), radio and shortwave communication types, or the like. In one or more embodiments, where two or more communication types are present, the communication system may translate some or all of a data stream from one type to another. Similarly, different data protocols may be used. Such translation may allow the communication system to act as a transference point for data transmission. The translation may allow for different types of equipment (e.g., first and second vehicle systems may each use communication types different from each other to communicate with each other via the communication system). The communication system may switch types, protocols, and/or communication pathways in response to delegation of signal or failure of one pathway. This may provide redundancy of communication by the communication system. In one embodiment, the communication system may decrypt, decompile, or disaggregate information, parse information, and send along all or part of a message (e.g., alone or combined with new data, or with encryption, or both). The communication system may be the same as or similar to other communication devices or communication systems described herein.

In one or more embodiments, the off-board controller may represent a back-office server or a dispatch center, such as of a positive vehicle control (PVC) system. A PVC system is a control system in which a vehicle is allowed to move, and/or is allowed to move outside a designated restricted manner (such as above a designated penalty speed limit), only responsive to receipt or continued receipt of one or more signals (e.g., received from off-board the vehicle system) that meet designated criteria, the signals have designated characteristics (e.g., a designated waveform and/or content) and/or are received at designated times (or according to other designated time criteria) and/or under designated conditions. This is opposed to 'negative' vehicle control systems where a vehicle system is allowed to move unless a signal (restricting movement) is received. The back-office server may be a vital or a non-vital system such that data stored, contained, maintained, communicated between, or the like, may be vital (e.g., protected) and/or non-vital (e.g., non-protected) data. Alternatively, the off-board control system represents another computerized system that communicates with vehicles and/or vehicle systems described herein.

Returning to FIG. 1, in one or more embodiments, the vehicle system, or one of the vehicles 112A-C of the vehicle system may be referred to as a portable distribution vehicle. For example, the portable distribution vehicle may be moved between different loading locations, unloading locations, transition holding locations, or other destinations in order to move cargo between the different locations. In one or more embodiments, the portable distribution vehicle may be referred to as a portable distribution warehouse, portable warehouse, portable storage facility, or the like, such that the portable distribution vehicle may move goods from one location to another, and may store or hold the goods at a distribution location for a predetermined amount or length of time, until a predetermined amount of the cargo or goods is removed from the portable distribution vehicle, or the like.

In one embodiment, the cargo may be goods that may be purchased or removed from the vehicle system by consumers or other individuals at the different locations. For example, the goods, supplies, cargo, or the like, may be loaded onto the portable distribution vehicle at a first loading location, the portable distribution vehicle may be moved to a distribution location, and the goods, supplies, cargo, or the like, may be removed from the portable distribution vehicle at the distribution location by a purchasing entity of the goods. As one example, the goods may be seasonal-based goods (e.g., school supplies or goods based on the start of a new school year, holiday goods or supplies based on an upcoming holiday season, home goods or supplies based on individuals moving into new lodging facilities such as apartments or college dormitories, video gaming goods and supplies based on new product release schedules, or the like). As another example, the goods may be environmentally-based goods (e.g., cold weather goods or supplies, warm weather supplies or goods, wet or dry weather goods or supplies, or the like). As another example, the goods or supplies may be consumer age-based goods (e.g., goods or supplies used by adults, goods or supplies used by elderly consumers, goods or supplies used by children, goods or supplies used by infants or toddlers, or the like). As another example, the goods or supplies may be geographically-based goods or supplies (e.g., rural or farm equipment or supplies, urban-based goods or supplies, water-based supplies for geographical areas proximate to water, land-based supplies, or the like).

The vehicle system may move between one or more different loading, unloading, transient, holding, or other destination locations along the one or more designated routes. In the illustrated embodiment of FIG. 1, the vehicle system may move between a first loading location 104, a second loading location 106, a first distribution location 108, and a second distribution location 110. For example, the vehicle system may be loaded with cargo at the first and second loading locations, and may be off-loaded of at least some of the cargo at the first and second distribution locations.

Figure 3:
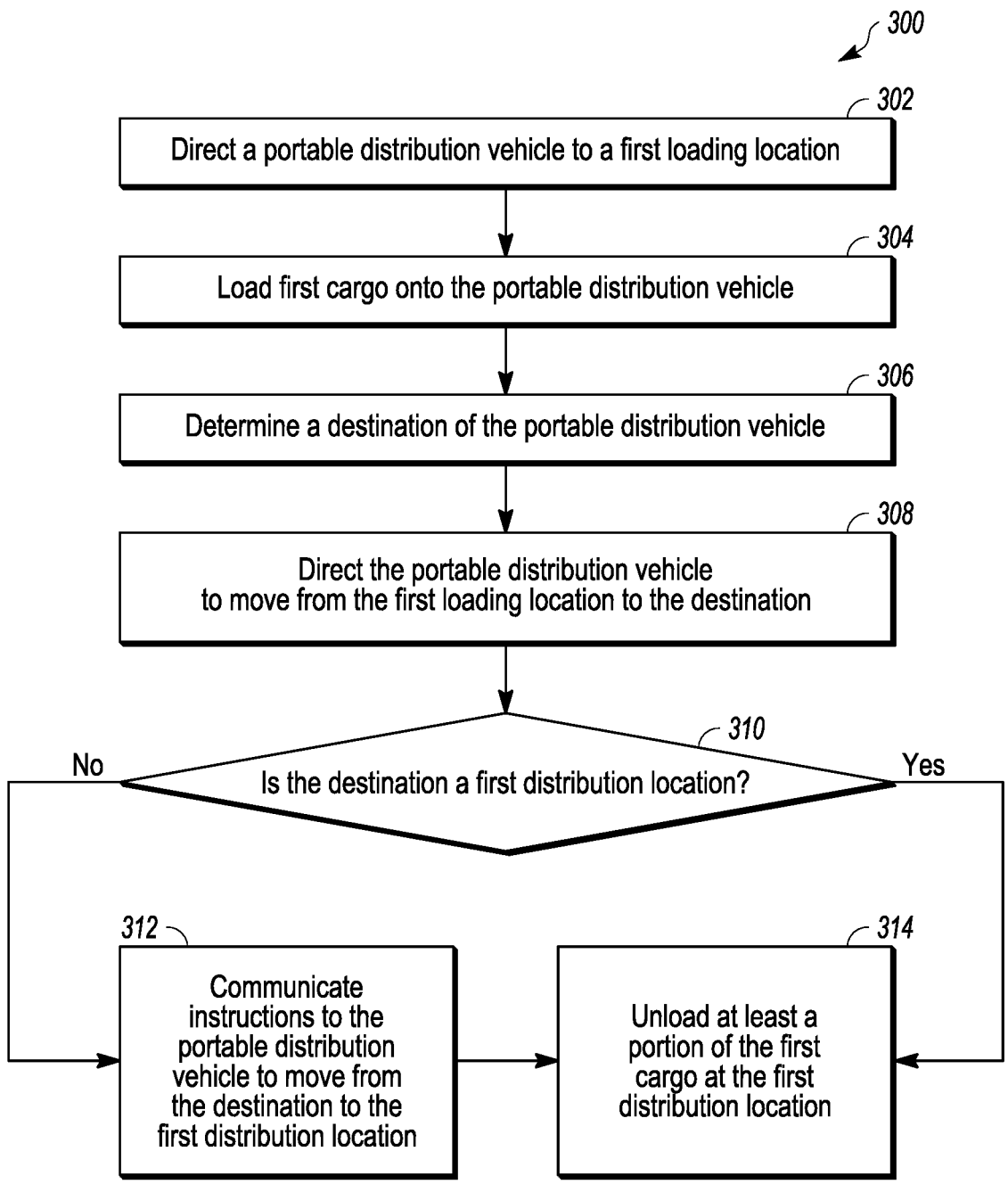
FIG. 3 illustrates a flowchart of a method of one example of controlling a portable distribution vehicle of the vehicle system shown in FIG. 1 in accordance with one embodiment.

FIG. 3 illustrates a flowchart 300 of one example of controlling the portable distribution vehicle system shown in FIG. 1 in accordance with one embodiment. The flowchart is for illustrative purposes, and may include one or more additional steps or may exclude one or more steps. Optionally, one or more of the steps may be performed in a different order than illustrated in FIG. 3.

At step 302, the portable distribution vehicle may be directed to move to a first loading location 104. In one embodiment, the portable distribution vehicle may receive instructions or command messages from the off-board controller directing the portable distribution vehicle to the first loading location. The command messages may automatically remotely control one or more operating settings of the portable distribution vehicle to move or propel the portable distribution vehicle toward the first loading location. In another embodiment, the portable distribution vehicle may receive the command messages from the off-board controller, and the command messages may include instructions for an operator onboard the vehicle system to manually control operation of the portable distribution vehicle to move toward the first loading location. Optionally, the portable distribution vehicle may already be positioned at the first loading location, and may communicate a confirmation to the off-board controller indicating the position of the portable distribution vehicle at the first loading location.

In one or more embodiments, a customer (e.g., an entity, a company, an individual, or the like) may send a request to the owner (e.g., entity, company, individual, or the like) of the portable distribution vehicle to move the portable distribution vehicle to the first loading location. In one or more embodiments, the customer may be the owner of the cargo. In another embodiment, the customer may be a third party coordinating efforts of moving the cargo between the owner of the cargo and the owner of the portable distribution vehicle. The request may be based on the customer needing to move cargo owned by the customer from the first loading location to first distribution location. For example, the cargo owned by the customer may be seasonal-based goods, environmentally-based goods, consumer age-based goods, geographically-based goods, or the like.

At step 304, first cargo may be loaded onto the portable distribution vehicle. In the illustrated embodiment of FIG. 1, a portion of the first cargo may be loaded onto each of the vehicles 112A, 112B, 112C, or alternatively the first cargo may be loaded onto one or more of the vehicles 112A-C. In one or more embodiments, the first cargo may be separated into different types, classes, classifications, or the like, and a first type of the first cargo may be loaded onto one vehicle (e.g., vehicle 112A), and a second type of the first cargo may be loaded onto a different vehicle (e.g., vehicle 112B).

At step 306, a destination of the portable distribution vehicle may be determined. In one embodiment, the destination may be the first distribution location shown in FIG. 1. In another embodiment, the destination may be the second loading location. In another embodiment, the destination may an intermediate location (e.g., a holding location or space where the portable distribution vehicle may stay or wait until instructions to move to a different destination or distribution location), the destination may be an intermediate security location (e.g., a storage shed or secure facility, or the like), or the like. In one or more embodiments, the destination may be determined by the owner of the portable distribution vehicle, by the customer of the portable distribution vehicle, by the owner of the first cargo being transported by the portable distribution vehicle, by a consumer of the first cargo, or the like.

For example, in one or more embodiments, the portable distribution vehicle may be directed to an intermediate location 130 shown in FIG. 1 that is between the first loading location and the first distribution location. The intermediate location may be a holding location, a stand-by location, a secure location, or the like. In one embodiment, the portable distribution vehicle may be directed to the intermediate location responsive to the portable distribution vehicle being unaware of a location of the first distribution location. For example, the portable distribution vehicle may move from the first loading location to the intermediate location, and may remain at the intermediate location until the portable distribution vehicle receives information related to the first distribution location. The information may include an address, geospatial coordinates, or the like. Optionally, the intermediate location may be a refueling location, where the portable distribution vehicle may be refueled and/or recharged. In one or more embodiments, the intermediate location may be a secured location such that access to the portable distribution vehicle may be controlled while the portable distribution vehicle is located at the intermediate location. In one or more embodiments, the portable distribution vehicle may receive instructions from the onboard and/or off-board controllers to move from the intermediate location to the first distribution location responsive to receiving the information related to the first distribution location.

At step 308, instructions may be communicated to the portable distribution vehicle from the off-board controller to automatically move from the first loading location to the destination. The instructions may automatically control one or more operating settings of the portable distribution vehicle to move from the first loading location to the destination. For example, the off-board controller may remotely control one or more operations of the portable distribution vehicle to move the portable distribution vehicle from the first loading location to the destination. Optionally, the instructions may include directions to an operator onboard the portable distribution vehicle to manually change one or more operating settings of the portable distribution to move toward the destination.

At step 310, a decision is made whether the destination is a distribution location, such as the first distribution location shown in FIG. 1. For example, the portable distribution vehicle may have moved from the first loading location to an intermediate location. The intermediate location may be a storage facility, a refueling location, a holding location, or the like. As one example, the portable distribution vehicle may be limited to travel during a predetermined period of time (e.g., during daylight hours, for a predetermined number of operating hours of an operator onboard the portable distribution vehicle) and the distance between the first loading location and the first distribution location prohibits the portable distribution vehicle from reaching the first distribution location within the predetermined period of time, causing the portable distribution vehicle to need to stop at the intermediate location.

As another example, the portable distribution vehicle may have a total energy or fuel storage capacity that is less than an amount of energy or fuel needed to travel from the first loading location to the first distribution location. For example, a distance between the first loading location and the first distribution location may be about 500 kilometers, but the portable distribution vehicle may have an energy storage capacity of storing enough energy or fuel to travel 300 kilometers. The portable distribution vehicle may need to stop at a refueling or recharging location between the first loading location and the first distribution location. Optionally, the portable distribution vehicle may need to stop at an intermediate location or destination other than the first distribution location for any alternative reason.

If the destination is not the distribution location, flow of the method proceeds toward step 312. At step 312, instructions may be communicated to the portable distribution vehicle to move from the destination to the first distribution location. The instructions may be command messages received by the onboard controller from the off-board controller that automatically control one or more operating settings of the portable distribution vehicle to move toward the first distribution location. Optionally, the command messages may include directions for an operator onboard the portable distribution vehicle to manually control operation of the portable distribution vehicle.

Alternatively, if the destination is the first distribution location, flow of the method proceeds toward step 314. At step 314, at least a portion of the first cargo may be unloaded at the first distribution location. In one or more embodiments, the portion of the first cargo may be unloaded from the portable distribution vehicle by the customer of the portable distribution vehicle, by the owner of the first cargo, by a consumer of the first cargo, by a third party entity (e.g., a delivery service company), or the like.

In one or more embodiments, access to the first cargo may be controlled while the portable distribution vehicle is at the first distribution location. For example, the first cargo may be held or positioned within an area or region of the portable distribution vehicle, and access to the area or region where the first cargo is being held may be controlled. As one example, the first cargo may be held within a storage locker, a secured housing, or the like, and access to the storage locker, secured housing, or the like may be controlled by a lock, a keypad, or the like. An individual or entity unloading the first cargo may be required to confirm that the individual or entity is an approved receiver of the first cargo before access to the first cargo is granted.

In one or more embodiments, the individual or entity unloading at least a portion of the first cargo must verify that the individual or entity is permitted or allowed to unload the first cargo. For example, the individual or entity may need to verity with the controller of the portable distribution vehicle, with the off-board controller, with a security system of the portable distribution vehicle, or the like, that the entity is an approved entity that is allowed or permitted to unload the first cargo from the portable distribution vehicle. For example, a first requesting receiver of the first cargo (e.g., an individual or entity requesting to unload the first cargo) may request to remove a portion of the first cargo from the portable distribution vehicle. The onboard controller, the off-board controller, a security system (e.g., keypad controlled locking system, key and lock system, fingerprint security system, voice confirmation system, or the like) of the portable distribution vehicle, or the like, may receive the request from the first requesting receiver.

The onboard controller, off-board controller, and/or the security system may determine whether the first requesting receiver is an approved receiver of the first cargo. If it is determined that the first requesting receiver is an approved receiver, access of the first cargo onboard the portable distribution vehicle may be allowed to the first requesting receiver. For example, the security system may change a state of a locking system of a portion of the vehicle system holding the first cargo from a locked state to an unlocked state to allow the first requesting receiver to access the first cargo. Alternatively, if it is determined that the first requesting receiver or another requesting receiver is an unapproved receiver, the unapproved received may be prohibited access of the first cargo. For example, the security system may remain in a locked state, and the unapproved receiver may be prohibited access to an area of the portable distribution vehicle where the first cargo is positioned.

In one or more embodiments, the on-board and/or off-board controllers may generate a schedule for the portable distribution vehicle. The schedule may be based on a loading time of the first cargo, a type of the first cargo, an amount of the first cargo, a frequency at which the same first cargo is moved between the first loading location and the first distribution location, an unloading time of the first cargo, a travel time of the portable distribution vehicle between the first loading location and the first distribution location, an environment in which the portable distribution vehicle moves between the first loading location and the first distribution location, a frequency at which the portable distribution vehicle may need to move the first cargo from the first loading location to the first distribution location, a time of year or ambient conditions in which the portable distribution vehicle will be traveling between the first loading location and the first distribution location, a customer requesting the first cargo to be moved between the loading and distribution locations, the owner of the portable distribution vehicle, an end user (e.g., consumer) of the first cargo, or the like.

Figure 4:
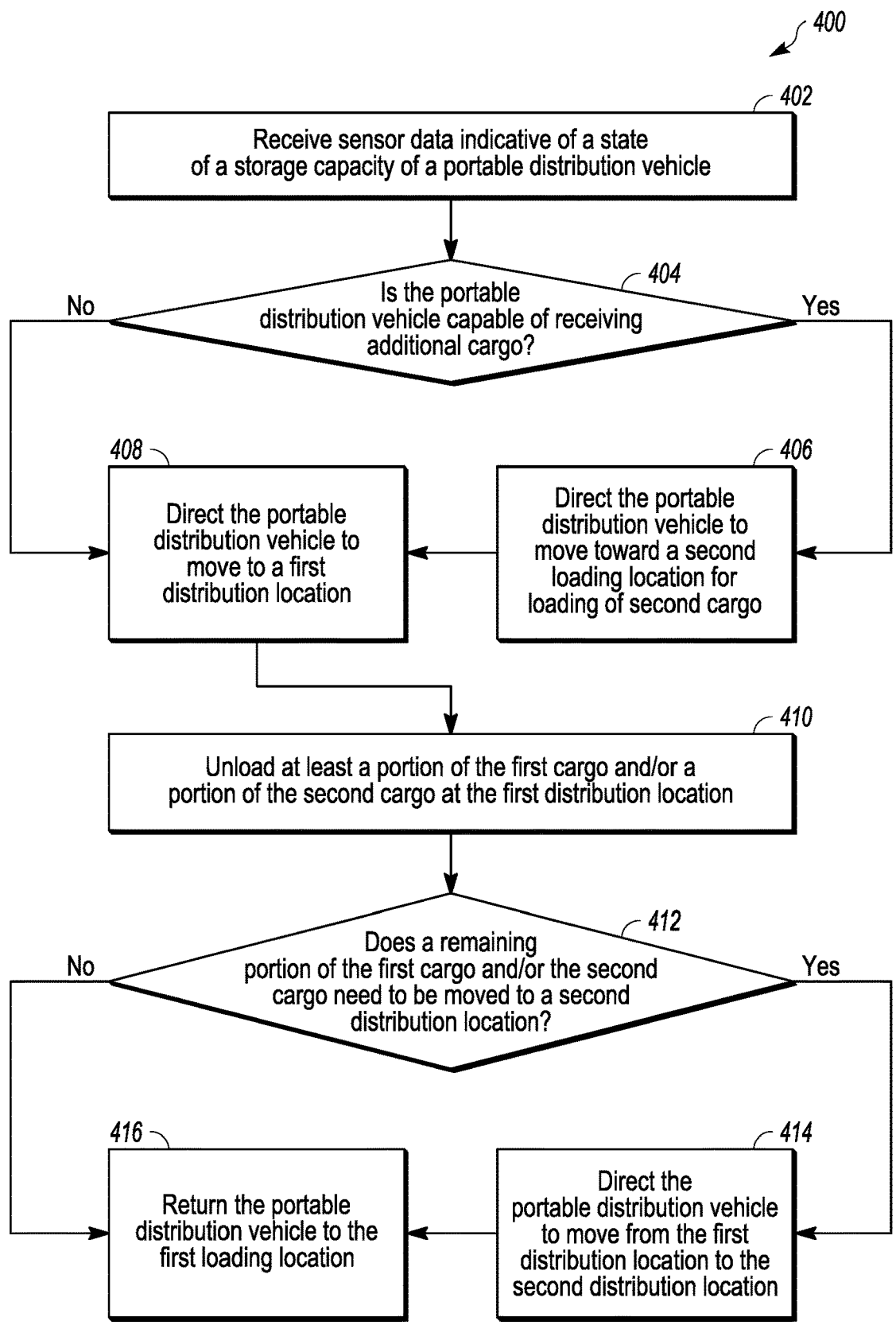
FIG. 4 illustrates flowchart of a method of one example of controlling movement of a portable distribution vehicle of the vehicle system shown in FIG. 1 in accordance with one embodiment.

FIG. 4 illustrates flowchart 400 of a method of one example of controlling movement of a portable distribution vehicle of the vehicle system shown in FIG. 1 in accordance with one embodiment. For example, the portable distribution vehicle shown in FIG. 1 may be directed from the first loading location 104 to the second loading location 106. In one embodiment, one or more sensors onboard the portable distribution vehicle or disposed proximate to the portable distribution vehicle may sense or otherwise detect data indicative of a state of a storage capacity of the portable distribution vehicle. The sensed data may be image (e.g., still or video image data) of a cargo carrying area of the portable distribution vehicle, may be a weight of the portable distribution vehicle or a weight of the cargo carrying area of the vehicle, may be infrared sensor data indicating locations and/or volumes of the first cargo onboard the portable distribution vehicle, or the like.

At step 402, the sensors onboard and/or off-board the portable distribution vehicle may communicate sensed data with the onboard controller and/or the off-board controller. At step 404, one or both of the onboard or off-board controllers may receive the sensed data and may determine whether the portable distribution vehicle is capable of receiving additional cargo based on the state of the storage capacity of the portable distribution vehicle. For example, if it is determined that the state of the storage capacity of the portable distribution vehicle allows the portable distribution vehicle to carry additional cargo (e.g., after the first cargo is loaded onto the portable distribution vehicle), flow of the method proceeds toward step 406. Alternatively, if it is determined that the state of the storage capacity of the portable distribution vehicle does not allow the portable distribution vehicle to carry any additional cargo, flow of the method may proceed towards step 408.

At step 406, responsive to determining that the portable distribution vehicle is capable of carrying additional cargo, the portable distribution vehicle may be directed to move toward the second loading location for loading of second cargo. In one or more embodiments, the second cargo may be combined with the first cargo. For example, the first cargo and the second cargo may be loaded into a common cargo carrying compartment, area, zone, or the like, of the portable distribution vehicle. In another embodiment, the second cargo may be loaded into a different cargo carrying area, compartment, or the like, then the first cargo such that the second cargo is separated from the first cargo. Optionally, the first cargo may be loaded onto a first vehicle of a multi-vehicle portable distribution vehicle system, and the second cargo may be loaded onto a second vehicle of the multi-vehicle portable distribution vehicle system.

At step 408, responsive to the portable distribution vehicle being loaded with the second cargo, or responsive to determining that the state of the storage capacity of the portable distribution prohibits carrying additional second cargo, the portable distribution vehicle may be directed to move to the first distribution location. For example, in one embodiment in which the portable distribution vehicle does not have the storage capacity to be loaded with second cargo, the portable distribution vehicle may move from the first loading location to the first distribution location. Alternatively, if the portable distribution vehicle does have the storage capacity to be loaded with the second cargo, the portable distribution vehicle may move from the second loading location to the first distribution location. In one or more embodiments, prior to moving to the first distribution location, the portable distribution vehicle may be directed to move from the second loading location to a third loading location, where a third cargo may be loaded onto the portable distribution vehicle.

At step 410, at least a portion of one or both of the first cargo and/or the second cargo may be unloaded from the portable distribution vehicle at the first distribution location. In one or more embodiments, the portable distribution vehicle may remain located at the first distribution location for a predetermined length of time (e.g., a day, a week, a month, or the like), until a predetermined amount of the first and/or second cargo has been unloaded, until all of the first and/or second cargo has been unloaded from the portable distribution vehicle, or the like.

In one or more embodiments, the first distribution location may be identified as an unsecured distribution location. For example, the portable distribution vehicle may be accessed by approved individuals or entities, by unapproved individuals or entities, or the like, while the portable distribution vehicle is located at the first distribution location. In one or more embodiments, the portable distribution vehicle may be located, parked, positioned, or the like, at the first distribution location for a predetermined length and/or period of time, and may be directed to move to the secured intermediate location 130 shown in FIG. 1 at times outside of the predetermined length or periods of time. For example, the portable distribution vehicle may be positioned, parked, or the like, at the first distribution location between the hours of 6:00 am and 8:00 pm, and may be directed to move to the secured intermediate location to be parked, positioned, or the like, at the secured intermediate location between the hours of 8:00 pm and 6:00 am. Optionally, the portable distribution vehicle may move back and forth between the first distribution location and the secured intermediate location for a predetermined length of time (e.g., a predetermined number of days, number of weeks, or the like), until a predetermined amount of the first and/or second cargo is removed or unloaded from the vehicle, or the like.

At step 412, a decision is made whether a remaining portion of one or both of the first cargo or the second cargo needs to be moved to a second distribution location 110 shown in FIG. 1. If a remaining portion of the first and/or second cargo needs to be moved to the second distribution location, flow of the method proceeds toward step 414. At step 414, the portable distribution vehicle is directed to move from the first distribution location to the second distribution location. At least part of the remaining portion of the first and/or second cargo may be unloaded from the portable distribution vehicle responsive to the portable distribution vehicle moving to the second distribution location. The portable distribution vehicle may remain at the second distribution location for a predetermined length of time, until a predetermined amount of the remaining portion of the first and/or second cargo is unloaded, until all of the remaining portion of the first and/or second cargo is unloaded, or the like.

In one or more embodiments, at step 416, the portable distribution vehicle may be directed to return to the first loading location. Optionally, the portable distribution vehicle may be directed to move to a third distribution location, where at least a portion of the remaining portion of the first and/or second cargo may be unloaded from the vehicle. Optionally, the portable distribution vehicle may be directed to move to a third loading location, where a third cargo may be loaded onto the portable distribution vehicle. Optionally, the portable distribution vehicle may be directed to move to a storage facility until a customer requests the portable distribution vehicle be used to move cargo, until the owner of the portable distribution vehicle schedules usage of the portable distribution vehicle, or the like.

Figure 5:
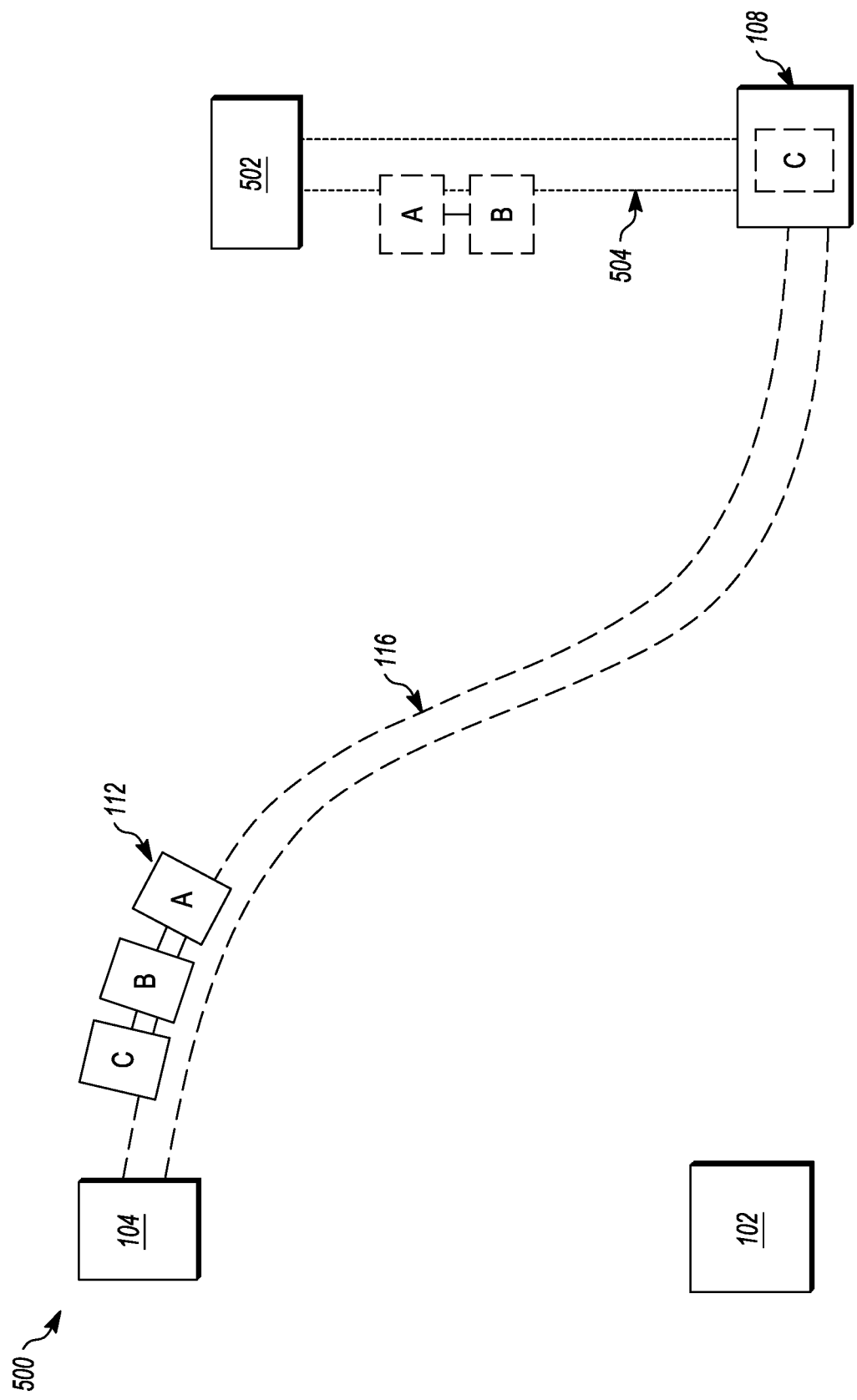
FIG. 5 illustrates a vehicle control system in accordance with one embodiment.

FIG. 5 illustrates a vehicle control system 500 in accordance with one embodiment. Like the vehicle control system shown in FIG. 1, the vehicle control system shown in FIG. 5 includes the portable distribution vehicle system 112 that includes the vehicles A, B, and C, that moves along designated routes 116, 504. The off-board controller 102 may remotely control operation of the portable distribution vehicle to move between the first loading location 104, the first distribution location 108, and a third location 502 (e.g., another loading location, another distribution location, an intermediate location, or the like).

In the illustrated embodiment, the portable distribution vehicle includes the vehicles 112A, 112B, 112C that are coupled together and move together between the first loading location and the first distribution location. In one embodiment, the vehicles may be rail vehicles that move along the designated tracks. Optionally, the vehicles may be marine vehicles that move along designated waterways, aerial vehicles that move along designated flight paths, non-rail vehicles that move along designated routes, or the like.

In one or more embodiments, one of the vehicles of the portable distribution vehicle system may be separated from the other vehicles. For example, in the illustrated embodiment of FIG. 5, the vehicle C is separated from the vehicles A and B such that the vehicle C remains at the first distribution location, and the vehicles A and B move away from the first distribution location along the designated route 504 toward the third location. For example, the vehicle C may be mechanically separated, communicably separated, logically separated, or the like, from the vehicles A and B after the portable distribution vehicle system reaching the first distribution location.

In one embodiment, a portion of the first cargo may be loaded onto the vehicle C to be unloaded at the first distribution location, and another portion of the first cargo may be loaded onto one or both of the vehicles A or B to be unloaded at the third location. Optionally, the vehicle C may be referred to as the portable distribution vehicle, and may travel together with the other vehicles A and B, such that the vehicles A and B do not carry the first cargo, carry a different type or classification of cargo, or the like. For example, the vehicle C may be referred to as the portable distribution vehicle responsive to the vehicle C carrying the first cargo to be unloaded at the first distribution location. In one embodiment, the vehicles A and B may carry commuters or passengers, that may be prohibited from deboarding the vehicles A, B at the first distribution location, that may be traveling to the third location, or the like.

Figure 6:
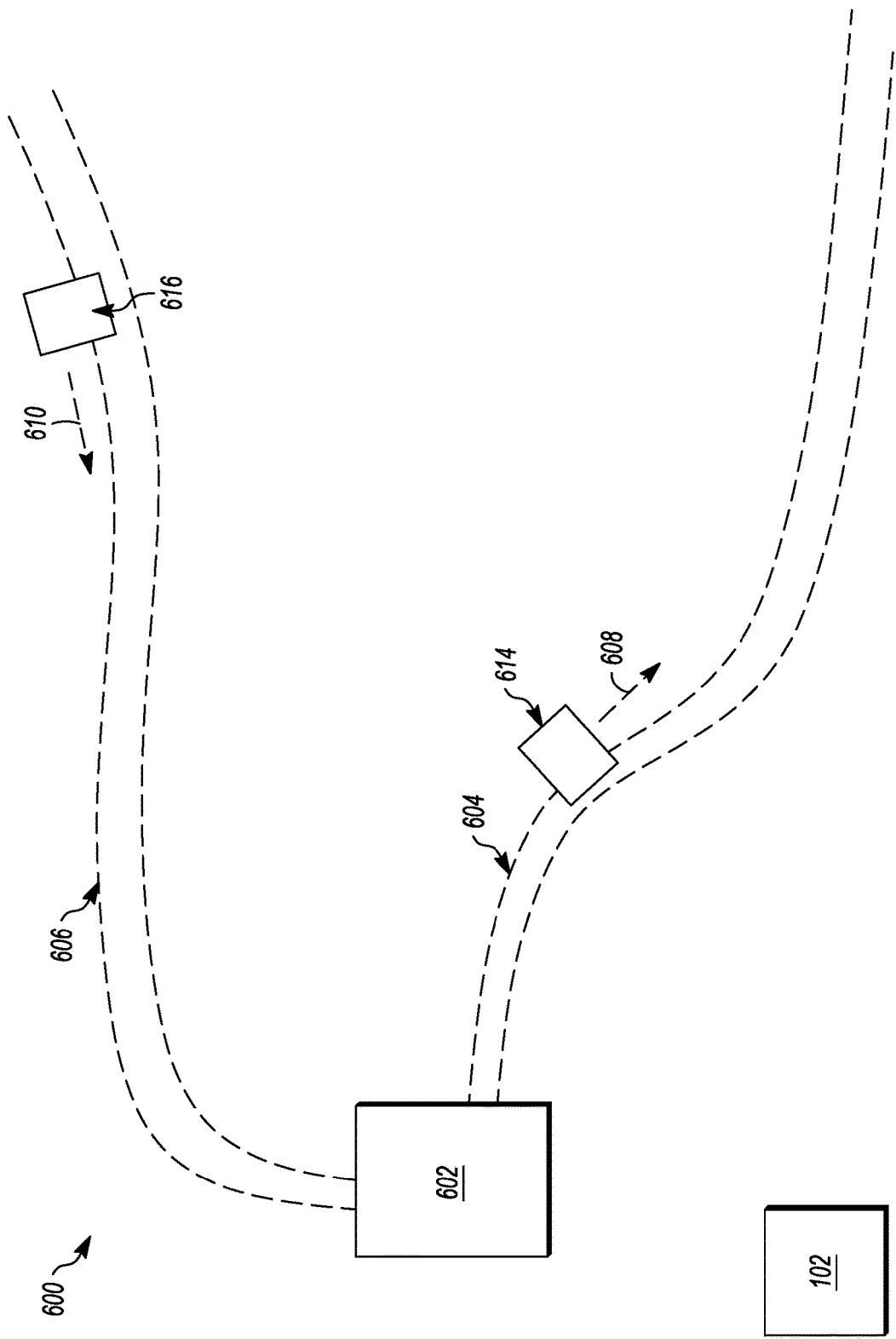
FIG. 6 illustrates a vehicle control system in accordance with one embodiment.

In one or more embodiments, a customer requesting to move cargo from a loading location to a distribution location may select or choose a portable distribution vehicle to use based on locations of different portable distribution vehicles relative to the location of the loading location and/or the location of the distribution location. For example, FIG. 6 illustrates a vehicle control system 600 in accordance with one embodiment. The vehicle control system may include the off-board controller that controls one or more operations of a first portable distribution vehicle 614 and/or that controls one or more operations of a second portable distribution vehicle 616. The portable distribution vehicles may move along designated routes 604, 606, respectively, between a loading location 602 and one or more other locations (not shown) such as distribution locations, second loading locations, intermediate locations, or the like.

Figure 7:
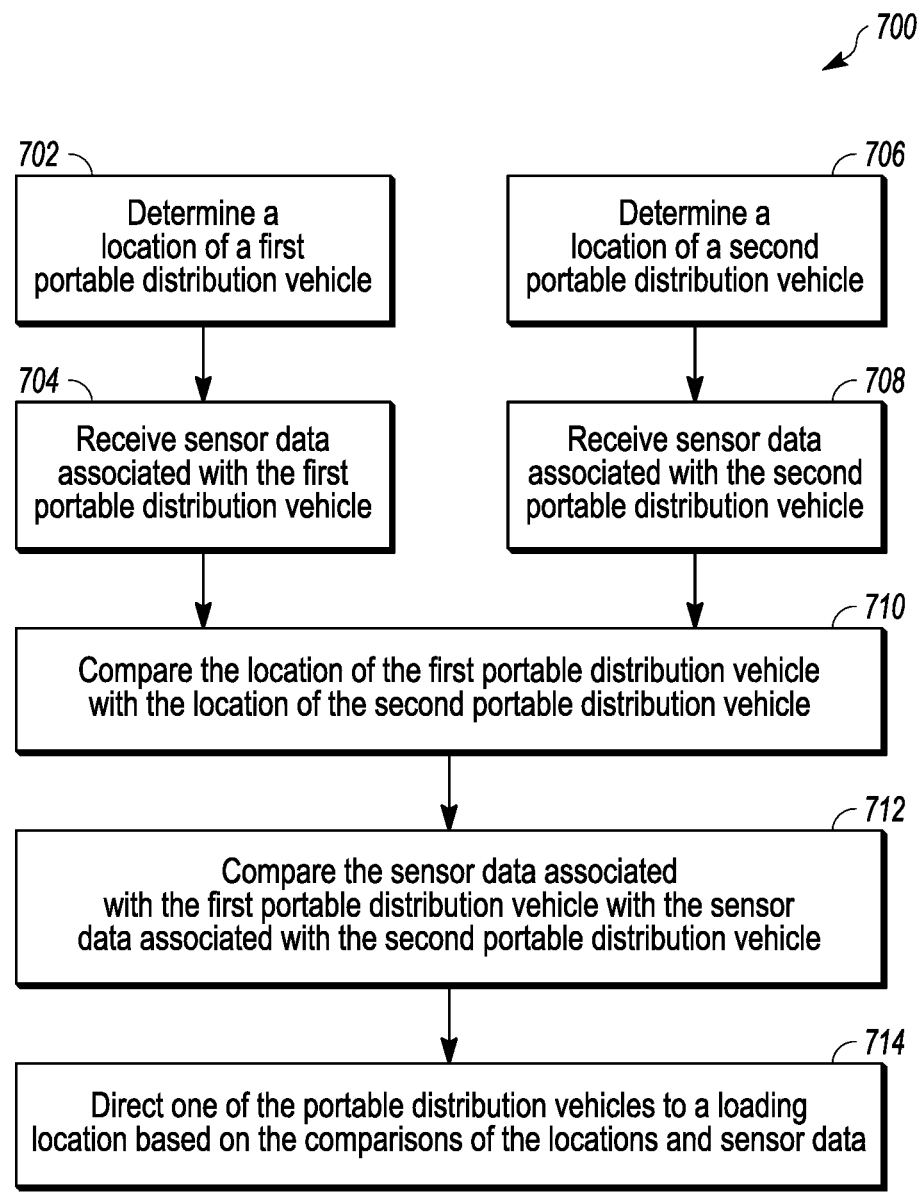
FIG. 7 illustrates a flowchart of a method of one example of selecting a portable distribution vehicle in accordance with one embodiment.

FIG. 7 illustrates a flowchart 700 of a method of one example of selecting one of plural portable distribution vehicles, such as the portable distribution vehicles shown in FIG. 6, in accordance with one embodiment. One or more of the steps shown in the flowchart illustrated in FIG. 7 may be performed or completed in an alternative order, may be omitted from the method, or the like. At step 702, the off-board controller may determine a location of the first portable distribution vehicle, and at step 706, the off-board controller may determine a location of the second portable distribution vehicle. The locations of the first and second vehicles may be geospatial locations, may include distances between the vehicles and the loading location, environmental or regional location data (e.g., rural locations, mountainous areas, areas of increased vehicle and/or pedestrian densities, or the like).

At step 704, the controller may receive sensor data from one or more sensors onboard and/or off-board the first portable distribution vehicle associated with the first portable distribution vehicle. At step 708, the controller may receive sensor data from one or more sensors onboard and/or off-board the second portable distribution vehicle associated with the second portable distribution vehicle. The sensor data may include data associated with a state of a storage capacity of the first and second portable distribution vehicles, data associated with operating conditions of the first and second portable distribution vehicles (e.g., an amount of energy or fuel available to operate the vehicle, a direction of travel of the vehicles (e.g., in the illustrated embodiment of FIG. 6, the first portable distribution vehicle is moving in a first direction 608 away from the loading location and the second portable distribution vehicle is moving in a second direction 610 toward the loading location), a state of different operating systems of each of the vehicles), data associated with a type, style, size, or the like, of each of the vehicles, historical data of the vehicles (e.g., ages, an amount of time of current operation or use, a total distance traveled by the vehicles, history of repairs and/or maintenance of the vehicles, or the like), or the like.

At step 710, the controller may compare the location of the first portable distribution vehicle with the location of the second portable distribution vehicle. At step 712, the controller may compare the sensor data associated with the first portable distribution vehicle with the sensor data associated with the second portable distribution vehicle. In one embodiment, the controller may compare sensor data of the first vehicle that corresponds with sensor data of the second vehicle. The corresponding sensor data may be data associated with the states of the storage capacities of each of the vehicles, or other data associated with each of the vehicles. In another embodiment, the controller may compare sensor data of the first vehicle that does not correspond with sensor data of the second vehicle. For example, the controller may receive some corresponding or similar sensor data of the first and second vehicles, and/or may receive non-corresponding or dissimilar sensor data of the first and second vehicles. In one embodiment, the dissimilar sensor data associated with the first and second vehicles may be weighted or scored in accordance with a predetermined reference scale such that the controller may compare the dissimilar sensor data according to the predetermined reference scale.

At step 714, one of the portable distribution vehicles may be directed to the loading location to load the selected portable distribution vehicle with cargo. The portable distribution vehicle that is selected to move toward the loading location be loaded with the cargo may be selected based on the comparison of the locations of the different vehicles, based on the comparison of the states of the storage capacities of the different vehicles, comparisons of other sensor data, or one or more other factors. In one embodiment, the customer requesting use of one of the portable distribution vehicles may select which of the portable distribution vehicles the customer would prefer to use. In another embodiment, the different portable distribution vehicles may be owned by a common entity or individual, and the owner may determine which portable distribution vehicle the customer may use. In another embodiment, the different vehicles may be owned by different entities or individuals, and the different entities may work together to determine which vehicle the customer may use, may work with a third party that may determine which vehicle the customer may use, or the like.

In one embodiment, the controller may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

In accordance with one embodiment, a method may include directing a portable distribution vehicle to a first loading location. The portable distribution vehicle may be loaded with first cargo at the first loading location. Instructions may be communicated to the portable distribution vehicle to move from the first loading location to a first distribution location. The first cargo may be unloaded at the first distribution location. The portable distribution vehicle may move along a designated route for the portable distribution vehicle. The portable distribution vehicle may be a first type of portable distribution vehicle that is allowed to move along the designated route. Vehicles of a second type that is different than the first type are prohibited from moving along the designated route. Operation of the portable distribution vehicle may be automatically controlled to move from the first loading location to the first distribution location without an operator onboard the portable distribution vehicle manually controlling the portable distribution vehicle.

Optionally, the first loading location and the first distribution location may be determined by an owner of the first cargo disposed onboard the portable distribution vehicle. Optionally, a schedule for the portable distribution vehicle may be generated based on one or more of a loading time of the first cargo, an unloading time of the first cargo, a travel time of the portable distribution vehicle from the first loading location to the first distribution location, or an environment in which the portable distribution vehicle moves from the first loading location to the first distribution location. Optionally, sensor data may indicate of a state of a storage capacity of the portable distribution vehicle may be received, and a determination may be made whether the portable distribution vehicle is capable of receiving additional cargo based on the state of the storage capacity of the portable distribution vehicle. Optionally, the portable distribution vehicle may be directed to a second loading location responsive to determining that the portable distribution vehicle is capable of receiving additional cargo. The portable distribution vehicle may be loaded with second cargo at the second loading location. Instructions may be communicated to the portable distribution vehicle to move from the second loading location to the first distribution location. At least a portion of one or both of the first cargo or the second cargo may be unloaded at the first distribution location. Optionally, the first cargo may be combined with the second cargo. Optionally, the first cargo may be loaded into a first area of the portable distribution vehicle, and the second cargo may be loaded into a second area of the portable distribution vehicle. Optionally, instructions may be communicated to the portable distribution vehicle to move from the first distribution location to a second distribution location. At least some of one or more of a remaining portion of the first cargo or a remaining portion of the second cargo may be unloaded at the second distribution location.

Optionally, access to the first cargo disposed onboard the portable distribution vehicle may be controlled while the portable distribution vehicle is at the first distribution location. Optionally, the method may include determining that a first requesting receiver of the first cargo is an approved receiver, and allowing access of the first cargo onboard the portable distribution vehicle to the first requesting receiver responsive to determining that the first requesting receiver is the approved received. Optionally, the method may include determining that a second requesting receiver of the first cargo is an unapproved received, and prohibiting access of the first cargo onboard the portable distribution vehicle to the second requesting receiver responsive to determining that the second requesting receiver is the unapproved receiver. Optionally, the portable distribution vehicle may be a rail vehicle that may move along a track between the first loading location and the first distribution location. Optionally, the portable distribution vehicle may be operably coupled with one or more other rail vehicles. The portable distribution vehicle may be separated from the one or more other rail vehicles at the first distribution location. The portable distribution vehicle may remain at the first distribution location and the one or more other rail vehicles may move away from the first distribution location. Optionally, the portable distribution vehicle may be directed to move from the first distribution location to the first loading location responsive to at least a portion of the first cargo being unloaded from the portable distribution vehicle at the first distribution location.

Optionally, the portable distribution vehicle may be a first portable distribution vehicle. A location of the first portable distribution vehicle and a location of a second portable distribution vehicle may be determined. Sensor data associated with a state of a storage capacity of the first portable distribution vehicle and sensor data associated with a state of a storage capacity of the second portable distribution vehicle may be received. The location of the first portable distribution vehicle may be compared with the location of the second portable distribution vehicle, and the state of the storage capacity of the first portable distribution vehicle may be compared with the state of the storage capacity of the second portable distribution vehicle. One of the first portable distribution vehicle or the second portable distribution vehicle may be directed to the first loading location based on the comparison of the location of the first portable distribution vehicle with the location of the second portable distribution vehicle, and the comparison of the state of the storage capacity of the first portable distribution vehicle with the state of the storage capacity of the second portable distribution vehicle. Optionally, the portable distribution vehicle may be directed from the first loading location to an intermediate location that is between the first loading location and the first distribution location. Information related to the first distribution location may be received. The information may include one or more of an address or geospatial coordinates of the first distribution location. Instructions may be communicated to the portable distribution vehicle to move from the intermediate location to the first distribution location responsive to receiving the information related to the first distribution location.

In accordance with one embodiment, a vehicle control system may include a controller having one or more processors that may direct a portable distribution vehicle to a first loading location. The portable distribution vehicle may be loaded with first cargo at the first loading location. The one or more processors may communicate instructions to the portable distribution vehicle to move from the first loading location to a first distribution location. The first cargo may be unloaded at the first distribution location. The portable distribution vehicle may be a first type of portable distribution vehicle that is allowed to move along a designated route. Vehicles of a second type that is different than the first type are prohibited from moving along the designated route. The instructions may automatically control operation of the portable distribution vehicle to move from the first loading location to the first distribution location without an operator onboard the distribution vehicle manually controlling the portable distribution vehicle.

Optionally, the first loading location and the first distribution location may be determined by an owner of the first cargo disposed onboard the portable distribution vehicle. Optionally, the one or more processors may generate a schedule for the portable distribution vehicle may be generated based on one or more of a loading time of the first cargo, an unloading time of the first cargo, a travel time of the portable distribution vehicle from the first loading location to the first distribution location, or an environment in which the portable distribution vehicle moves from the first loading location to the first distribution location. Optionally, the controller may receive sensor data indicative of a state of a storage capacity of the portable distribution vehicle may be received, and may determine whether the portable distribution vehicle is capable of receiving additional cargo based on the state of the storage capacity of the portable distribution vehicle. Optionally, the one or more processors may direct the portable distribution vehicle to a second loading location responsive to determining that the portable distribution vehicle is capable of receiving additional cargo. The portable distribution vehicle may be loaded with second cargo at the second loading location. The one or more processors may communicate instructions to the portable distribution vehicle to move from the second loading location to the first distribution location. At least a portion of one or both of the first cargo or the second cargo may be unloaded at the first distribution location. Optionally, the first cargo may be loaded into a first area of the portable distribution vehicle, and the second cargo may be loaded into a second area of the portable distribution vehicle. Optionally, the controller may communicate instructions to the portable distribution vehicle to move from the first distribution location to a second distribution location. At least some of one or more of a remaining portion of the first cargo or a remaining portion of the second cargo may be unloaded at the second distribution location.

Optionally, the one or more processors may control access to the first cargo disposed onboard the portable distribution vehicle while the portable distribution vehicle is at the first distribution location. Optionally, the one or more processors may determine that a first requesting receiver of the first cargo is an approved receiver of the first cargo. The one or more processors may allow access of the first cargo to the first requesting receiver responsive to determining that the first requesting receiver is the approved receiver. Optionally, the one or more processors may determine that a second requesting receiver of the first cargo is an unapproved receiver of the first cargo. The one or more processors may prohibit access of the first cargo to the second requesting receiver responsive to determining that the second requesting receiver is the unapproved receiver. Optionally, the portable distribution vehicle may be a rail vehicle that may move along a track between the first loading location and the first distribution location. Optionally, the portable distribution vehicle may be operably coupled with one or more other rail vehicles. The portable distribution vehicle may be separated from the one or more other rail vehicles at the first distribution location. The portable distribution vehicle may remain at the first distribution location and the one or more other rail vehicles may move away from the first distribution location. Optionally, the portable distribution vehicle may be directed to move from the first distribution location to the first loading location responsive to at least a portion of the first cargo being unloaded from the portable distribution vehicle at the first distribution location.

Optionally, the portable distribution vehicle may be a first portable distribution vehicle. The one or more processors may determine a location of the first portable distribution vehicle and a location of a second portable distribution vehicle. The one or more processors may receive sensor data associated with a state of a storage capacity of the first portable distribution vehicle and sensor data associated with a state of a storage capacity of the second portable distribution vehicle. The one or more processors may direct one of the first portable distribution vehicle or the second portable distribution vehicle may be directed to the first loading location based on a comparison of the location of the first portable distribution vehicle with the location of the second portable distribution vehicle, and a comparison of the state of the storage capacity of the first portable distribution vehicle with the state of the storage capacity of the second portable distribution vehicle. Optionally, the one or more processors may direct the portable distribution vehicle from the first loading location to an intermediate location that is between the first loading location and the first distribution location. The one or more processors may receive information related to the first distribution location while the portable distribution vehicle is at the intermediate location. The information may include one or more of an address or geospatial coordinates of the first distribution location. The one or more processors may communicate instructions to the portable distribution vehicle to move from the intermediate location to the first distribution location responsive to receiving the information related to the first distribution location.

In accordance with one embodiment, a method may include directing a portable distribution rail vehicle to a first loading location. The portable distribution rail vehicle may be loaded with first cargo at the first loading location. Instructions may be communicated to the portable distribution rail vehicle to move from the first loading location to a distribution location. The first cargo may be unloaded at the distribution location. The portable distribution rail vehicle may move along a designated track for the portable distribution rail vehicle. Non-rail vehicles may be prohibited from moving along the designated track. Access to the first cargo disposed onboard the portable distribution rail vehicle may be controlled while the portable distribution rail vehicle is at the distribution location by determining whether a requesting receiver is an approved receiver or an unapproved receiver. The approved received is allowed access to the first cargo, and the unapproved received is prohibited access to the first cargo. The portable distribution rail vehicle may be directed to move away from the distribution location to the first loading location or another loading location responsive to at least a portion of the first cargo being unloaded from the portable distribution rail vehicle at the distribution location by the approved received.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein define the parameters of the inventive subject matter, they are exemplary embodiments. Other embodiments will be apparent to one of ordinary skill in the art upon reviewing the above description. The scope of the inventive subject matter should, therefore, be determined with reference to the appended claims, along with the full scope of equivalents to which such claims are entitled.

This written description uses examples to disclose several embodiments of the inventive subject matter, including the best mode, and to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
communicating instructions to a portable distribution vehicle that is loaded with first cargo to move along a designated route from a first loading location to a first distribution location for unloading at least some of the first cargo, wherein the portable distribution vehicle is a first type of portable distribution vehicle that is allowed to move along the designated route, and vehicles of a second type that is different than the first type are prohibited from moving along the designated route;
automatically controlling operation of the portable distribution vehicle to move from the first loading location to the first distribution location without an operator onboard the portable distribution vehicle manually controlling the portable distribution vehicle;
controlling access to the first cargo that is disposed onboard the portable distribution vehicle via one or more processors while the portable distribution vehicle is at the first distribution location; and
controlling the portable distribution vehicle to move between the first distribution location and an intermediate location each day for a designated number of days so that the portable distribution vehicle is at the first distribution location during a first time period of each of the days and is at the intermediate location during a second time period of each of the days, wherein the intermediate location is a secured location that restricts access to the portable distribution vehicle.

2. The method of claim 1, further comprising:
generating a schedule for the portable distribution vehicle based on one or more of a loading time of the first cargo, an unloading time of the first cargo, a travel time of the portable distribution vehicle from the first loading location to the first distribution location, or an environment in which the portable distribution vehicle moves from the first loading location to the first distribution location.

3. The method of claim 1, further comprising:
receiving sensor data indicative of a state of a storage capacity of the portable distribution vehicle; and
determining whether the portable distribution vehicle is capable of receiving additional cargo based on the state of the storage capacity of the portable distribution vehicle.

4. The method of claim 3, further comprising:
directing the portable distribution vehicle to a second loading location responsive to determining that the portable distribution vehicle is capable of receiving additional cargo, the portable distribution vehicle configured to be loaded with second cargo at the second loading location; and communicating instructions to the portable distribution vehicle to move from the second loading location to the first distribution location, wherein at least a portion of one or both of the first cargo or the second cargo are configured to be unloaded at the first distribution location.

5. The method of claim 4, wherein the first cargo is configured to be loaded into a first area of the portable distribution vehicle, and the second cargo is configured to be loaded into a second area of the portable distribution vehicle.

6. The method of claim 4, further comprising communicating instructions to the portable distribution vehicle to move from the first distribution location to a second distribution location, wherein at least some of one or more of a remaining portion of the first cargo or a remaining portion of the second cargo is configured to be unloaded at the second distribution location.

7. The method of claim 1, wherein controlling the access comprises:
determining, via the one or more processors, that a first requesting receiver of the first cargo is an approved receiver;
automatically changing a locked state of a locking system of the portable distribution vehicle to permit the first requesting receiver access to the first cargo onboard the portable distribution vehicle responsive to determining that the first requesting receiver is the approved receiver;
determining, via the one or more processors, that a second requesting receiver of the first cargo is an unapproved receiver; and
maintaining the locked state of the locking system to block the second requesting receiver from accessing the first cargo onboard the portable distribution vehicle responsive to determining that the second requesting receiver is the unapproved receiver.

8. The method of claim 1, wherein the portable distribution vehicle is a first portable distribution vehicle, and further comprising:
determining a location of the first portable distribution vehicle and a location of a second portable distribution vehicle;
receiving sensor data associated with a state of a storage capacity of the first portable distribution vehicle and a state of a storage capacity of the second portable distribution vehicle;
comparing the location of the first portable distribution vehicle with the location of the second portable distribution vehicle;
comparing the state of the storage capacity of the first portable distribution vehicle with the state of the storage capacity of the second portable distribution vehicle; and
directing one of the first portable distribution vehicle or the second portable distribution vehicle to the first loading location based on the comparison of the location of the first portable distribution vehicle with the location of the second portable distribution vehicle, and the comparison of the state of the storage capacity of the first portable distribution vehicle with the state of the storage capacity of the second portable distribution vehicle.

9. The method of claim 1, further comprising:
directing the portable distribution vehicle from the first loading location to an intermediate location that is between the first loading location and the first distribution location;
receiving information related to the first distribution location while the portable distribution vehicle is at the intermediate location, the information including one or more of an address or geospatial coordinates of the first distribution location; and
communicating instructions to the portable distribution vehicle to move from the intermediate location to the first distribution location responsive to receiving the information related to the first distribution location.

10. A vehicle control system comprising:
a controller comprising one or more processors and configured to communicate instructions to a portable distribution vehicle that is at a first loading location and is loaded with at least a first cargo, the instructions configured to automatically control operation of the portable distribution vehicle to move from the first loading location to a first distribution location for unloading at least some of the first cargo without an operator onboard the portable distribution vehicle manually controlling the portable distribution vehicle, wherein the portable distribution vehicle is a first type of portable distribution vehicle that is allowed to move along a designated route, and vehicles of a second type that is different than the first type are prohibited from moving along the designated route,
the controller configured to control a locking system on a portion of the portable distribution vehicle that contains the first cargo to control access to the first cargo disposed onboard the portable distribution vehicle while the portable distribution vehicle is at the first distribution location,
wherein the controller is configured to control the portable distribution vehicle to move between the first distribution location and an intermediate location each day for a designated number of days so that the portable distribution vehicle is at the first distribution location during a first time period of each of the days and is at the intermediate location during a second time period of each of the days, wherein the intermediate location is a secured location that restricts access to the portable distribution vehicle.

11. The vehicle control system of claim 10, wherein the controller is configured to generate a schedule for the portable distribution vehicle based on one or more of a loading time of the first cargo, an unloading time of the first cargo, a travel time of the portable distribution vehicle from the first loading location to the first distribution location, or an environment in which the portable distribution vehicle moves from the first loading location to the first distribution location.

12. The vehicle control system of claim 10, wherein the controller is configured to receive sensor data indicative of a state of a storage capacity of the portable distribution vehicle, the controller configured to determine whether the portable distribution vehicle is capable of receiving additional cargo based on the state of the storage capacity of the portable distribution vehicle.

13. The vehicle control system of claim 12, wherein the controller is configured to direct the portable distribution vehicle to a second loading location responsive to determining that the portable distribution vehicle is capable of receiving additional cargo, the portable distribution vehicle configured to be loaded with second cargo at the second loading location, the controller configured to communicate instructions to the portable distribution vehicle to move from the second loading location to the first distribution location, wherein at least a portion of one or both of the first cargo or the second cargo are configured to be unloaded at the first distribution location.

14. The vehicle control system of claim 13, wherein the controller is configured to communicate instructions to the portable distribution vehicle to move from the first distribution location to a second distribution location, wherein at least some of one or more of a remaining portion of the first cargo or a remaining portion of the second cargo is configured to be unloaded at the second distribution location.

15. The vehicle control system of claim 10, wherein the portable distribution vehicle is a rail vehicle configured to move along a track between the first loading location and the first distribution location.

16. The vehicle control system of claim 15, wherein the portable distribution vehicle is operably coupled with one or more other rail vehicles, wherein the portable distribution vehicle is configured to be separated from the one or more other rail vehicles at the first distribution location, wherein the portable distribution vehicle is configured to remain at the first distribution location, and the one or more other rail vehicles are configured to move away from the first distribution location.

17. The vehicle control system of claim 10, wherein the controller is configured to direct the portable distribution vehicle from the first loading location to an intermediate location that is between the first loading location and the first distribution location,
   the controller configured to receive information related to the first distribution location while the portable distribution vehicle is at the intermediate location, the information including one or more of an address or geospatial coordinates of the first distribution location,
   the controller configured to communicate instructions to the portable distribution vehicle to move from the intermediate location to the first distribution location responsive to receiving the information related to the first distribution location.

18. A method comprising: communicating instructions to a portable distribution rail vehicle that is loaded with first cargo to move from a first loading location to a distribution location, wherein the portable distribution rail vehicle is configured to move along a designated track for the portable distribution rail vehicle, wherein non-rail vehicles are prohibited from moving along the designated track; controlling access to the first cargo disposed onboard the portable distribution rail vehicle, via one or more processors while the portable distribution rail vehicle is at the distribution location, wherein the access to the first cargo is controlled by: receiving an access request from a requesting receiver; determining, via the one or more processors, whether a requesting receiver is an approved receiver or an unapproved receiver; allowing the approved receiver access to the first cargo by the one or more processors automatically changing a locked state of a locking system of the portable distribution rail vehicle; and blocking the unapproved receiver from accessing the first cargo by the one or more processors maintaining the locked state of the locking system; directing the portable distribution rail vehicle to move away from the distribution location to the first loading location or another loading location responsive to at least a portion of the first cargo being unloaded from the portable distribution rail vehicle at the distribution location by the approved receiver; and controlling the portable distribution rail vehicle to move between a first distribution location and an intermediate location each day for a designated number of days so that the portable distribution rail vehicle is at the first distribution location during a first time period of each of the days and is at the intermediate location during a second time period of each of the days, wherein the intermediate location is a secured location that restricts access to the portable distribution rail vehicle.

* * * * *